(12) United States Patent
Tomi

(10) Patent No.: US 11,100,313 B2
(45) Date of Patent: Aug. 24, 2021

(54) INFORMATION PROCESSING APPARATUS, METHOD OF CONTROLLING THE SAME, AND STORAGE MEDIUM STORING A PROGRAM

(71) Applicant: CANON KABUSHIKI KAISHA, Tokyo (JP)

(72) Inventor: Hideyasu Tomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 16/050,597

(22) Filed: Jul. 31, 2018

(65) Prior Publication Data

US 2019/0042839 A1     Feb. 7, 2019

(30) Foreign Application Priority Data

Aug. 3, 2017   (JP) .............................. JP2017-151035

(51) Int. Cl.
*H04N 1/44* (2006.01)
*G06F 21/32* (2013.01)
*G06K 9/00* (2006.01)
*H04N 1/00* (2006.01)
(Continued)

(52) U.S. Cl.
CPC ......... *G06K 9/00342* (2013.01); *G06F 21/32* (2013.01); *G06F 21/608* (2013.01); *G06K 9/00228* (2013.01); *G06K 9/00288* (2013.01); *G06K 9/2018* (2013.01); *H04N 1/00896* (2013.01); *H04N 1/442* (2013.01); *G06T 2207/10048* (2013.01)

(58) Field of Classification Search
CPC ............. G06K 9/00342; G06K 9/2018; G06K 9/00288; G06K 9/00228; H04N 1/442; H04N 1/00896; G06F 21/608; G06F 21/32; G06T 2207/10048

See application file for complete search history.

(56) References Cited

U.S. PATENT DOCUMENTS

2013/0201168 A1*  8/2013  Lu .................... G09G 3/3406
                                                      345/207
2017/0041503 A1*  2/2017  Nobutani ........... G06K 9/00255

FOREIGN PATENT DOCUMENTS

JP    2015-166171 A    9/2015
JP    2017-033358 A    2/2017
(Continued)

OTHER PUBLICATIONS

Japanese Office Action dated May 7, 2021 in corresponding Japanese Patent Application No. 2017-151035.

*Primary Examiner* — Marcus Hammonds
(74) *Attorney, Agent, or Firm* — Venable LLP

(57) ABSTRACT

An information processing apparatus comprises a detection unit detecting a moving body around the information processing apparatus and a distance to the moving body; a first image capturing unit having a first image capturing range; and a second image capturing unit having a second image capturing range, and performs authentication of the authentication target person based on captured image data. It controls so as to perform authentication based on image data captured by the first image capturing unit, and if the detected distance becomes shorter than a first distance and the authentication is not possible, it controls so as to perform authentication based on image data captured by the second image capturing unit.

14 Claims, 8 Drawing Sheets

(51) Int. Cl.
 *G06K 9/20* (2006.01)
 *G06F 21/60* (2013.01)

(56) References Cited

FOREIGN PATENT DOCUMENTS

| | | |
|---|---|---|
| JP | 2017033357 A | 2/2017 |
| JP | 2017-117119 A | 6/2017 |

* cited by examiner

FIG 6
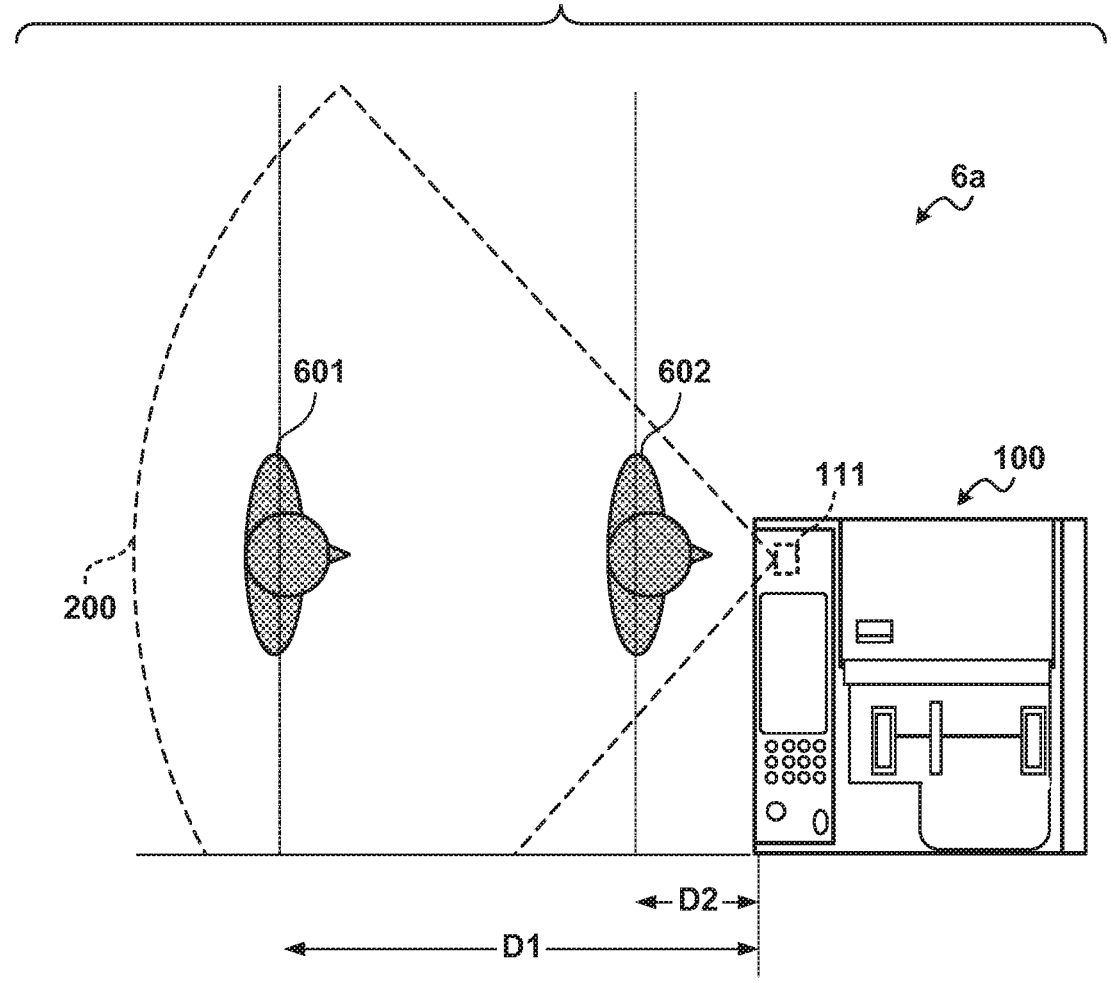
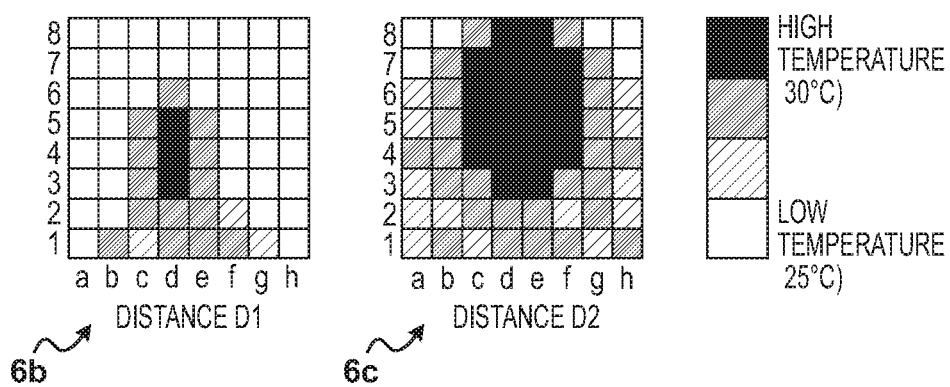

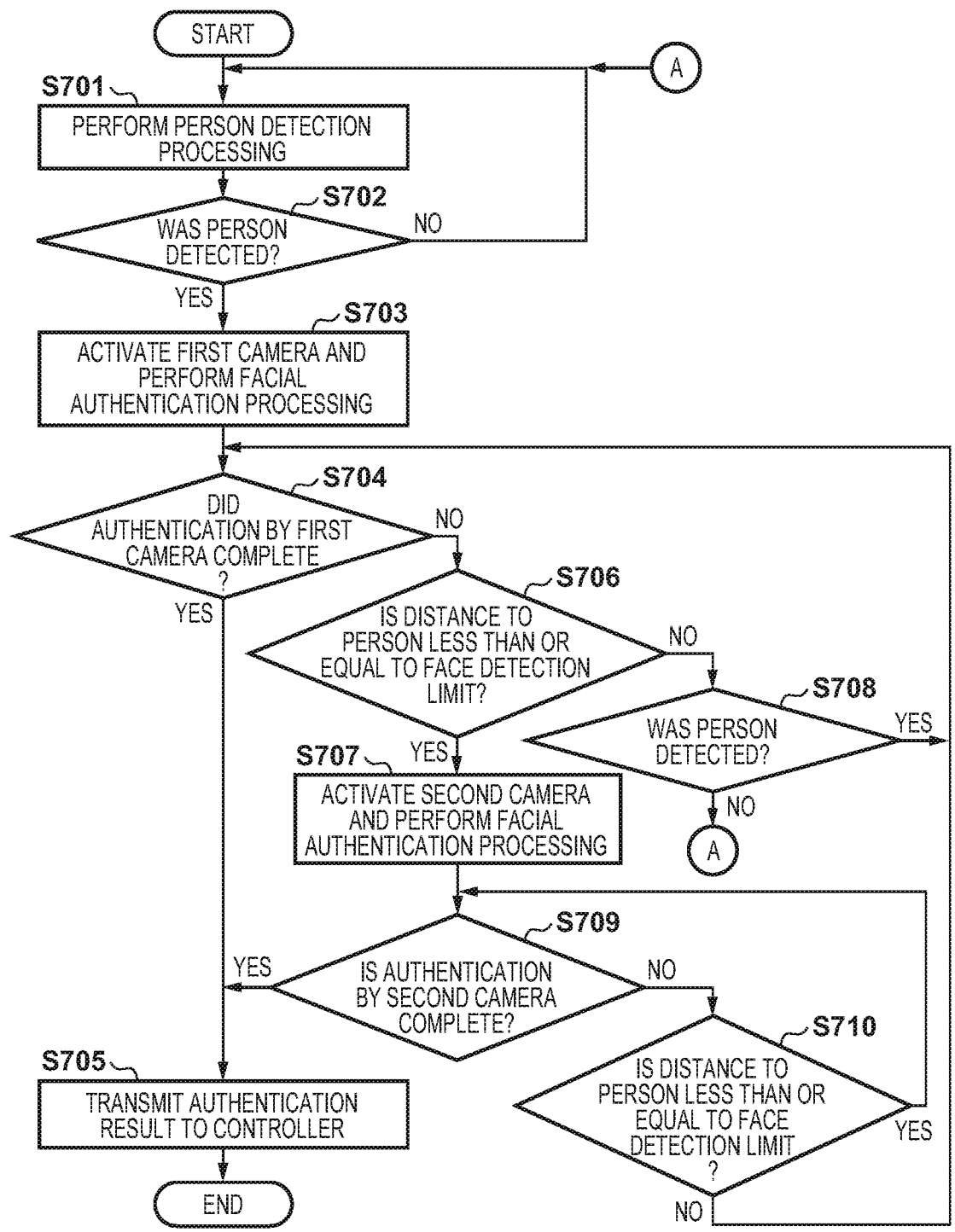

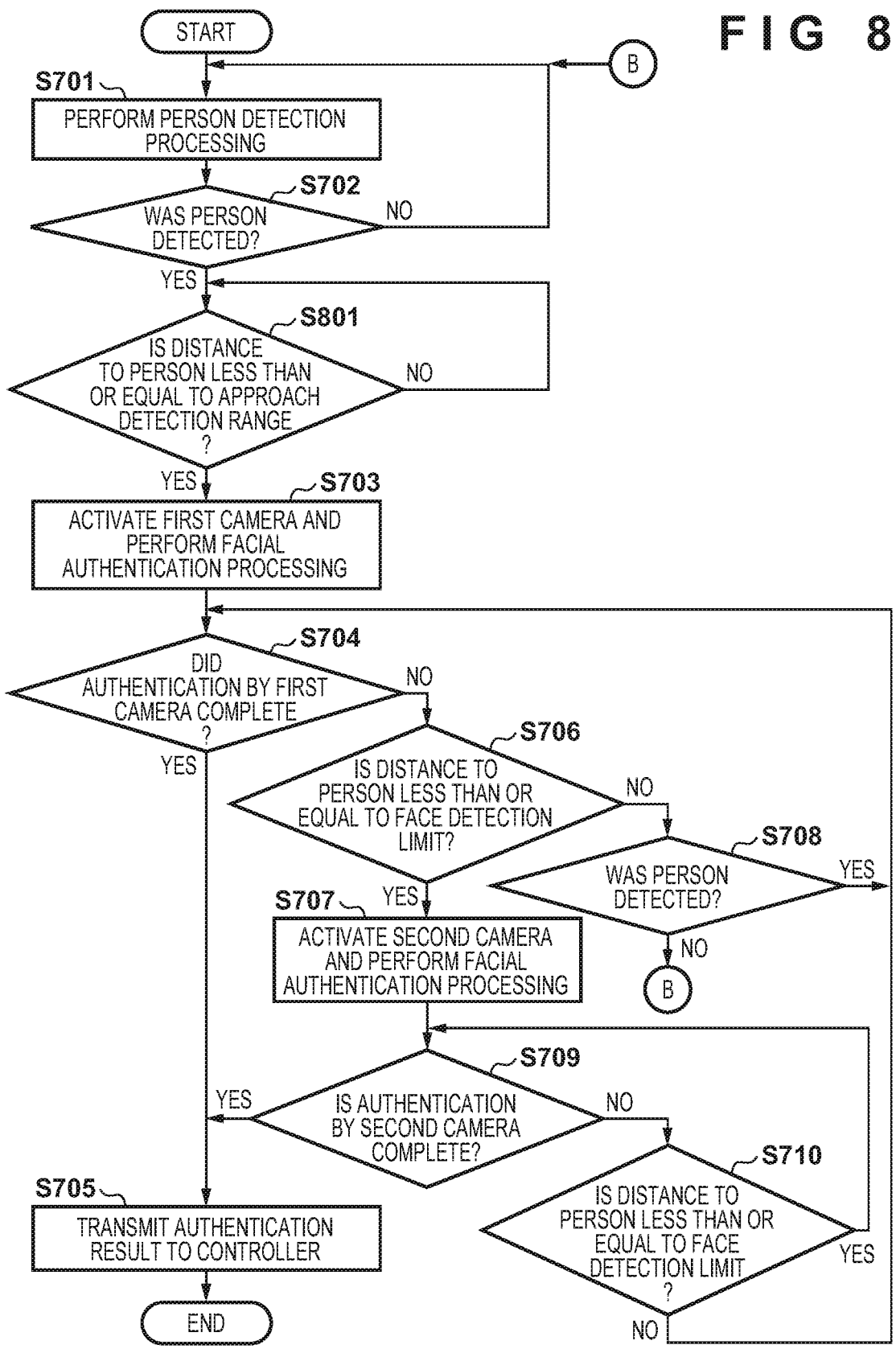

INFORMATION PROCESSING APPARATUS, METHOD OF CONTROLLING THE SAME, AND STORAGE MEDIUM STORING A PROGRAM

BACKGROUND OF THE INVENTION

Field of the Invention

The present invention relates to an information processing apparatus, a method of controlling the same, and a storage medium storing a program.

Description of the Related Art

Image forming apparatuses, such as multi function peripherals, on the front of which an image capturing unit is arranged and that perform an authentication of a person approaching the image forming apparatus based on an image captured by the image capturing unit, have been proposed conventionally. Japanese Patent Laid-Open No. 2017-33357 describes, in addition to authentication of a person, determining whether or not a person is close to an image forming apparatus based on an image captured by an image capturing unit, and causing the image forming apparatus to return from a sleep mode to a standby mode based on the determination result.

In order to perform facial authentication of a person approaching the image forming apparatus by using the image capturing unit, it is necessary to obtain, within a range in which the image capturing unit can capture, image data having feature amounts for the face of the person that is sufficient for performing the facial authentication. In Japanese Patent Laid-Open No. 2017-33357, in order to determine by the image capturing unit whether or not a person is approaching the image forming apparatus, the direction of the front part of the feet of the person is detected. Accordingly, due to a restriction on where the image capturing unit can be installed, it is not possible to capture a face image of the person within a predetermined distance in the surroundings of the image forming apparatus. In other words, there is a possibility that for a person who approached to a range in which their face cannot be captured by the image capturing unit, image data having feature amounts of the face that is sufficient for performing facial authentication by the image capturing unit cannot be obtained. Accordingly, there is a problem of not being able to perform facial authentication of the person due to the position of the image capturing unit and the position of the approaching person.

SUMMARY OF THE INVENTION

An aspect of the present invention is to eliminate the above-mentioned problems with the conventional technology.

The present invention provides a technique in which it is possible to perform, regardless of the position of an image capturing unit of an information processing apparatus and the position of an approaching moving body, detection and authentication of the moving body.

One aspect of the present invention provides an information processing apparatus, comprising: a detection unit configured to detect a moving body around the information processing apparatus and a distance to the moving body; a first image capturing unit having a first image capturing range; and a second image capturing unit having a second image capturing range that is different from the first image capturing range; a memory device that stores a set of instructions; and at least one processor that executes the set of instructions to: based on image data captured by the first image capturing unit or the second image capturing unit, perform authentication of an authentication target person; and in accordance with the detection of the moving body by the detection unit, control so as to perform authentication based on image data captured by the first image capturing unit, and in a case where the distance detected by the detection unit becomes shorter than a first distance and the authentication is not possible, control so as to perform authentication based on image data captured by the second image capturing unit.

By virtue of the present invention there is the effect that it is possible to perform, regardless of the position of an image capturing unit of an information processing apparatus and the position of an approaching moving body, detection and authentication of the moving body.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to describe the principles of the invention.

FIG. 6 shows views for describing a method of distance detection in which an infrared array sensor is used in the image forming apparatus.

FIG. 7 is a flowchart for describing processing in which a person detection/facial authentication unit of the image forming apparatus performs a person detection/facial authentication.

FIG. 8 is a flowchart for describing processing in which a person detection/facial authentication unit of the image forming apparatus performs a person detection/facial authentication.

DESCRIPTION OF THE EMBODIMENTS

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note, in the following description, although the information processing apparatus according to the present invention is described with the example of an image forming apparatus such as a multi function peripheral for example, the information processing apparatus according to the present invention is not limited to such an image forming apparatus and may be an information apparatus such as a PC, a communication apparatus, or a printer.

First Embodiment

Figure 1:
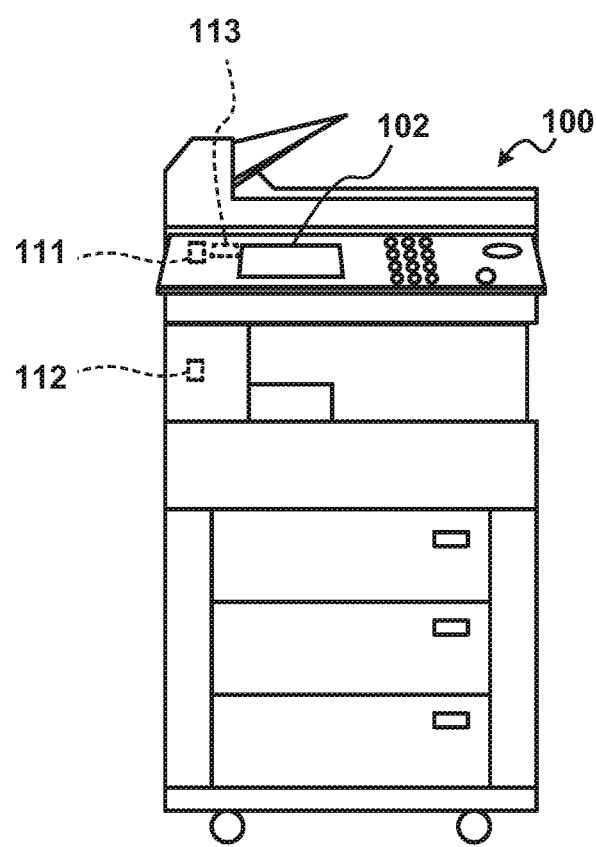
FIG. 1 is a perspective view of an image forming apparatus.

FIG. 1 is a perspective view of an image forming apparatus 100 according to a first embodiment of the present invention.

The image forming apparatus 100 is described as a multi function peripheral having a plurality of functions such as a print function, a scanner function, a copy function, and a FAX function. The image forming apparatus 100 is equipped with a person detection sensor 111 for detecting a person near the image forming apparatus 100, a first camera 112, and a second camera 113. In the first embodiment, the person detection sensor 111 and the first camera 112 are attached to the front of the image forming apparatus 100 and the detecting direction and capturing direction are facing the front of the image forming apparatus 100 as illustrated in FIG. 1. Also, the second camera 113 is attached to the left side of an operation unit 102, described later, of the upper portion of the front side of the image forming apparatus 100, and faces upward.

Here, the person detection sensor 111 has a function for detecting movement of a moving body (such as a person), which may be a user, in front of the image forming apparatus 100, and the person detection sensor 111 is a pyroelectric infrared sensor, an ultrasonic sensor, an infrared array sensor, or the like, for example. Also, the first camera 112 is arranged on the front surface of the image forming apparatus 100 and has a function for capturing the front of the image forming apparatus 100. Also, the second camera 113 has a function for capturing upwards of the image forming apparatus 100. Here, a fish-eye lens is mounted in the first camera 112. Thereby, the first camera 112 can capture an image with a wider angle than compared to a case where a normal lens is used.

Note, in the following description, an image that the first camera 112 captures is referred to as a first camera image and an image that the second camera 113 captures is referred to as a second camera image.

Note, in the first embodiment, it is assumed that the capturable range of the first camera 112 is wider (a large angle-of-view, for example) than that of the second camera 113.

Figure 2:
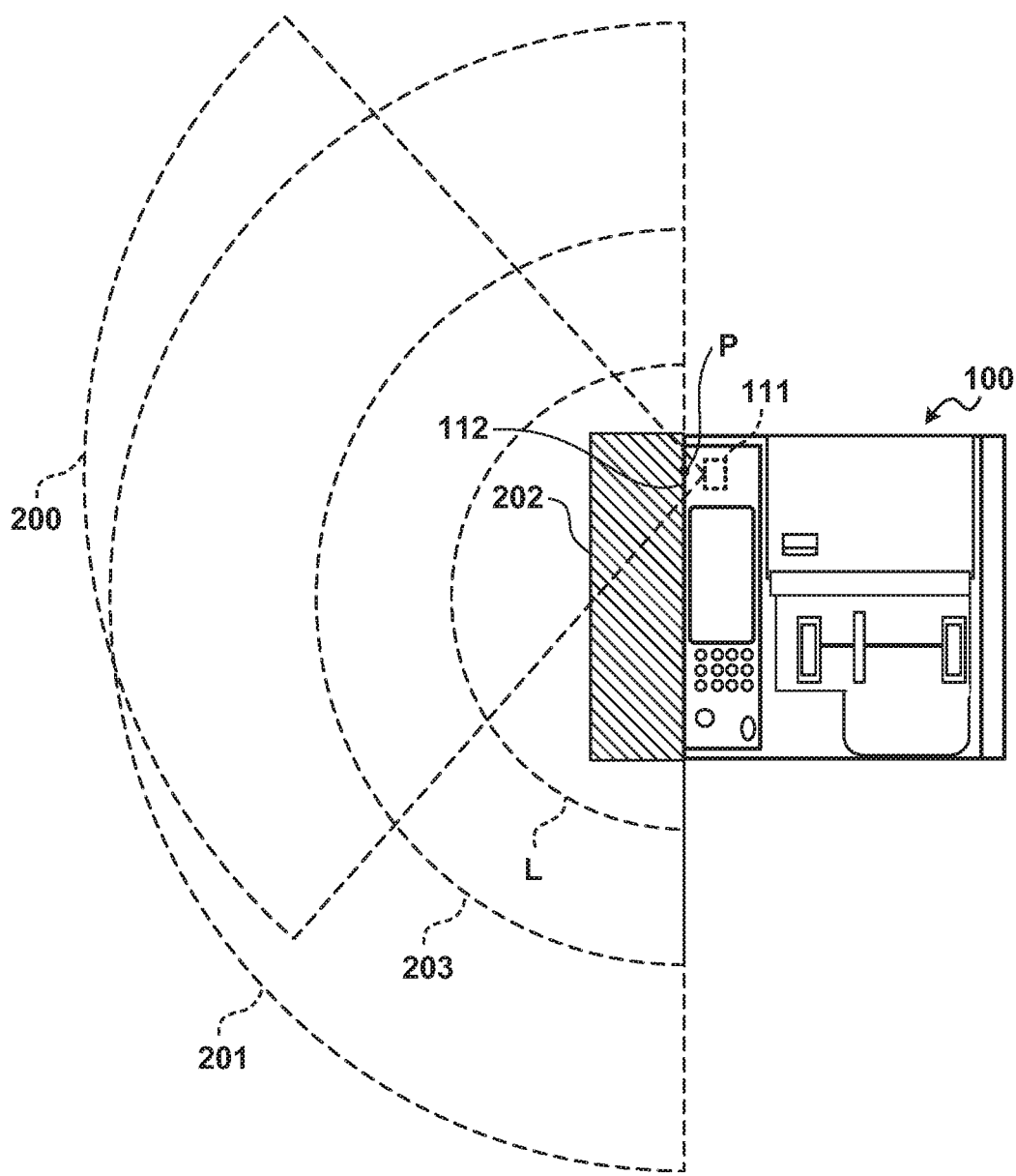
FIG. 2 is a top view for describing the range in which a person is detected in the image forming apparatus.

FIG. 2 is a top view for describing the range in which the presence of a person is detected in the image forming apparatus 100 according to a first embodiment. FIG. 2 illustrates the image forming apparatus 100 and surroundings thereof as a view from the perspective of the upper side in the height direction of the image forming apparatus 100.

Figure 3:
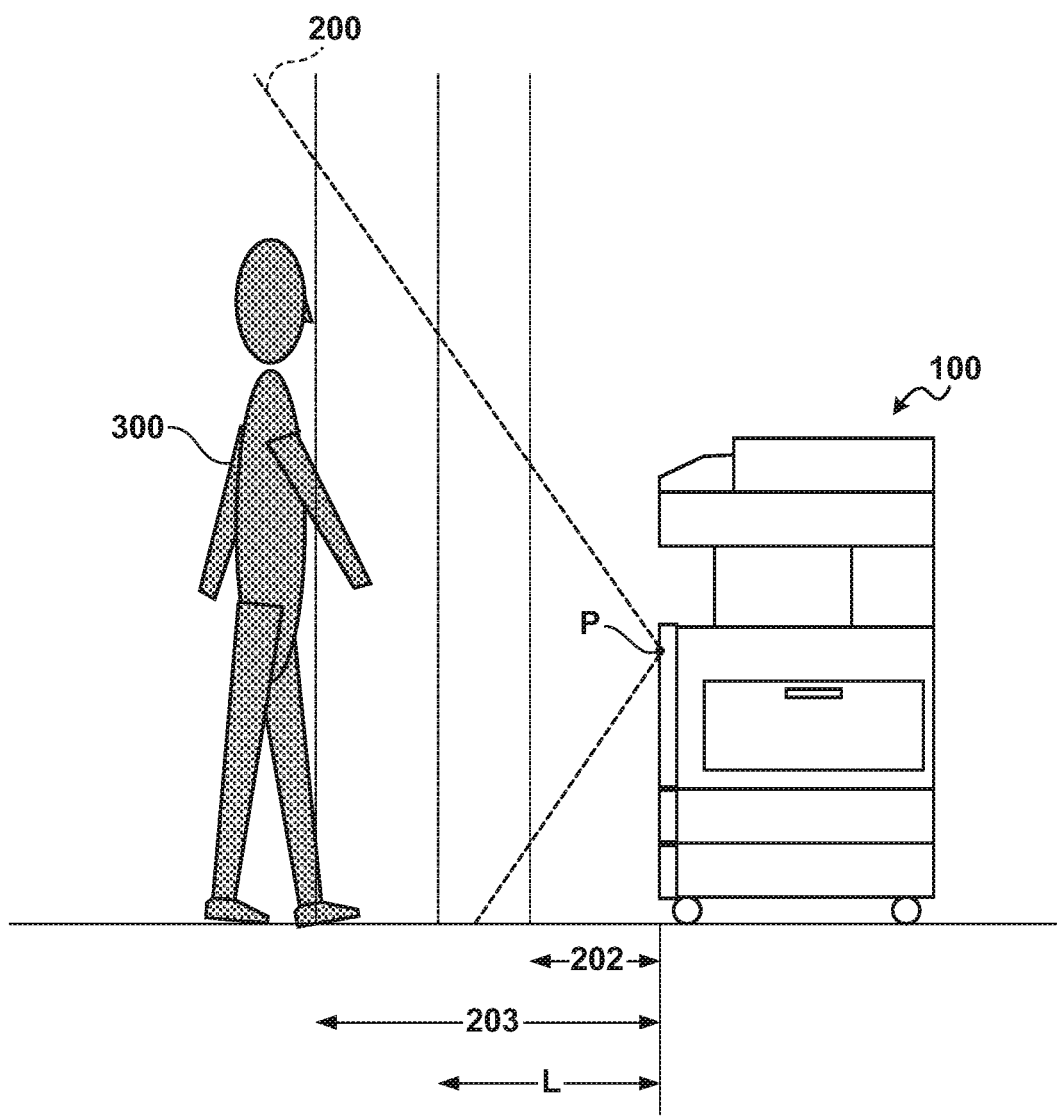
FIG. 3 is a side view for describing the range in which the presence of a person is detected in the image forming apparatus.

FIG. 3 is a side view for describing the range in which the presence of a person is detected in the image forming apparatus 100 according to a first embodiment. FIG. 3 illustrates the image forming apparatus 100 and surroundings thereof as a view from the perspective of the side of the image forming apparatus. Note, a person 300 is also illustrated in FIG. 3.

Here, the site at which the first camera 112 of the image forming apparatus 100 is attached is indicated by a position P of the image forming apparatus 100, as illustrated in FIG. 2 and FIG. 3.

In this example, the person detection sensor 111 can detect a person within a detection range 200. The detection range 200 is formed at the front of the image forming apparatus 100 and is of a fan shape whose central angle is set to be less than 180 degrees when viewed from the upper side in the height direction.

Also, in this example, by using the result of analyzing the first camera image that the first camera 112 captured, a person who is present within a person detection range 201, a person operation range 202, and an approach detection range 203 is detected.

Among these the person detection range 201 is formed at the front of the image forming apparatus 100 and is of a fan shape whose central angle is set to be less than 180 degrees when viewed from the upper side in the height direction. The person detection range 201 is set so as to include the majority of the detection range 200. Note, the central angle of the person detection range 201 may be something other than 180 degrees. However, at the least, the image capturing range of the first camera 112 is made to be the entirety of the person detection range 201. Meanwhile, the person operation range 202 indicates a range in which there is a high possibility of the presence of a person who will operate the image forming apparatus 100, that is formed in front of the image forming apparatus 100, and that is represented by a rectangle when viewed from the upper side in the height direction. In this example, the length in the widthwise direction in this rectangular range is about the same as length in the widthwise direction of the image forming apparatus 100. Also, the entire region of the person operation range 202 is within the person detection range 201. Additionally, the person operation range 202 is positioned at the side closest to the image forming apparatus 100 within the person detection range 201.

Also, the approach detection range 203 indicates a range in which there is a high possibility that a person who will operate the image forming apparatus 100 will enter, that is formed in front of the image forming apparatus 100, and that is represented by a fan shape whose central angle is set to 180 degrees when viewed from the upper side in the height direction. Also, the entire region of the approach detection range 203 is positioned within the person detection range 201. Additionally, the approach detection range 203 is positioned at the side closest to the image forming apparatus 100 within the person detection range 201. Also, the entire region of the person operation range 202 as described above is positioned within the approach detection range 203. Additionally, the person operation range 202 is positioned at the side closest to the image forming apparatus 100 within the approach detection range 203.

In the image forming apparatus 100 according to a first embodiment, by using image data obtained by capturing, by the first camera 112, the face of the person 300 approaching the image forming apparatus 100, facial authentication to determine whether or not usage of the image forming apparatus 100 is permitted is performed, as described later. Also, in the image forming apparatus 100, by using the first camera image that the first camera 112 captured, the front part of the feet of the person 300 within the person detection range 201 is detected and it is determined whether or not the person 300 is facing the image forming apparatus 100, as described later.

Here, because the height of the image forming apparatus 100 is normally set to approximately 1000 to 1300 mm in consideration of ease of use, the height of the first camera 112 becomes approximately 700 to 900 mm from the installation surface (floor surface) of the image forming apparatus 100. Also, as described above, because it is necessary to capture the front part of the feet of the person 300 by using the first camera 112, the height of the first camera 112 is limited to a relatively low position. For this reason, the height from installation surface of the image forming apparatus 100 to the position P of the first camera 112 is lower than the height of the face of a typical adult (the person 300) as illustrated in FIG. 3. Accordingly, when a person is too close to the image forming apparatus 100, even if a fish-eye lens is used, capturing of the face of the person 300 by the first camera 112 becomes difficult, and, even if the face of the person 300 can be captured, analysis of face image data obtained becomes difficult.

Accordingly, in the first embodiment, a limit on the distance at which it is possible to analyze the face image data of the person 300 by analyzing the first camera image that the first camera 112 captured is defined as the face detection limit L. The face detection limit L is decided based on the distance at which it is possible to capture the face of a person 300 having a typical height by the first camera 112. In the first embodiment, the face detection limit L is positioned outside of the person operation range 202 and within the approach detection range 203.

In a case where there is currently a person 300 who is trying to use the image forming apparatus 100 according to a first embodiment, the person 300 first enters within the detection range 200. Next, the person 300 who entered within the detection range 200 enters within the person detection range 201, and then enters from the approach detection range 203 to the person operation range 202. Note, in the first embodiment, the person 300 who moved within the person detection range 201 breaks the face detection limit L while entering the person operation range 202 from the approach detection range 203. Then, while the person 300 who entered the person operation range 202 stays within the person operation range 202, the person 300 performs operations and the like using the operation unit 102.

Note, it is not necessary for each of the person detection range 201, the person operation range 202, and the approach detection range 203 to be strictly set as is illustrated in FIG. 2, and it is sufficient that the precision be such that identification is possible based on the first camera image that the first camera 112 captured. Also, it is not necessary for the face detection limit L to be set between the person operation range 202 and the approach detection range 203, and the face detection limit L changes depending on the performance of the first camera 112 and the attachment position (height of position P from the layout surface).

Figure 4:
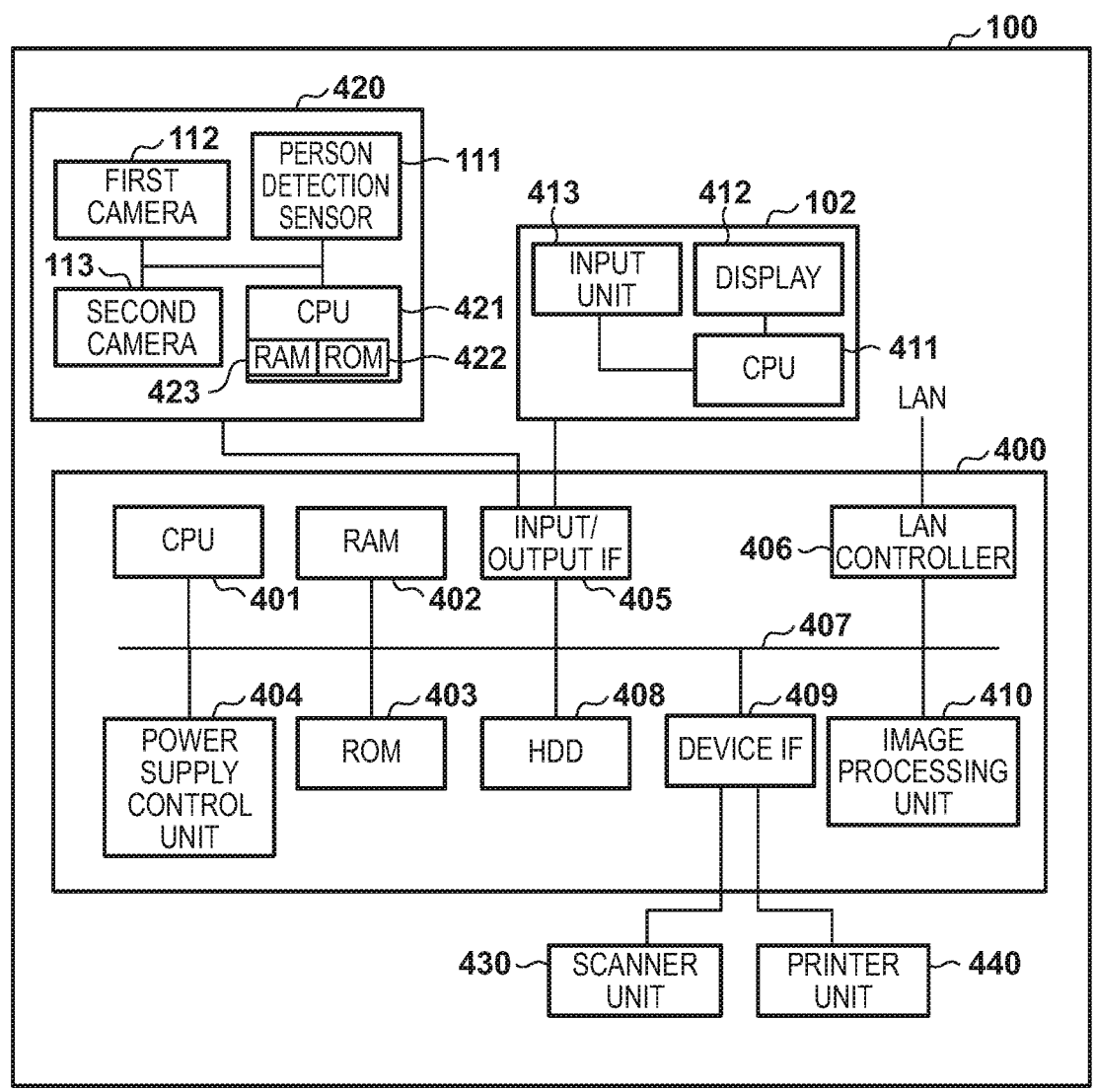
FIG. 4 is a block diagram for describing a hardware configuration of the image forming apparatus.

FIG. 4 is a block diagram for describing a hardware configuration of the image forming apparatus 100 according to a first embodiment.

The image forming apparatus 100 is equipped with a controller 400 for controlling operations of the image forming apparatus 100, the operation unit 102, a person detection/facial authentication unit 420, a scanner unit 430, and a printer unit 440.

The controller 400 can communicate with the operation unit 102, the person detection/facial authentication unit 420, the scanner unit 430, and the printer unit 440. Also, the controller 400 is equipped with a CPU 401, a RAM 402, a ROM 403, a power supply control unit 404, an input/output I/F (interface) 405, and a LAN controller 406, and these are connected via a bus 407. Also, the controller 400 is equipped with an HDD 408, a device I/F 409, and an image processing unit 410, and these are connected to the bus 407.

The CPU 401 executes a boot program stored in the ROM 403, loads a control program and the like stored in the HDD 408 into the RAM 402, and executes the loaded program to comprehensively control access between various devices. Furthermore, the CPU 401 also comprehensively controls various processes executed by the controller 400. The CPU 401, the operation unit 102, and the person detection/facial authentication unit 420 perform communication via the input/output I/F 405. Also, the CPU 401, the scanner unit 430, and the printer unit 440 perform communication via the device I/F 409. Additionally, in a case in which the image forming apparatus 100 has not been used for a predetermined time such as when the operation unit 102 has not been operated for a certain time, the CPU 401 causes a power mode of the image forming apparatus 100 to transition from a standby mode to a sleep mode via the power supply control unit 404. The standby mode is a state in which it is possible to execute a read operation by the scanner unit 430 and a print operation by the printer unit 440. The sleep mode is a power saving state in which power consumption is lower than in the standby mode. In the sleep mode, power is supplied to only the LAN controller 406, the power supply control unit 404, a CPU 411 of the operation unit 102, a CPU 421 of the person detection/facial authentication unit 420, and the person detection sensor 111 which are necessary for returning from the power saving state.

The RAM 402 provides a system work memory for the CPU 401 to operate and is a memory for temporarily storing image data and the like. A boot program and the like of the image forming apparatus 100 is stored in the ROM 403. The power supply control unit 404 is a block that controls the power supply of the image forming apparatus 100, and performs control of the power supply by instructions from the CPU 401 and by operation of a power saving button by a user. The power supply control unit 404 can detect a power supply off operation by the power source switch, and notifies the CPU 401 of the result of detection as a power supply off request. When the power supply off request is received, the CPU 401 causes the image forming apparatus 100 to transition to a state in which the power supply off is possible, and performs an instruction for stopping the power supply to the power supply control unit 404.

The LAN controller 406 performs transmission/reception of information with an external apparatus such as a PC (Personal Computer) (not shown) connected to a LAN. The HDD 408 is a hard disk drive and stores system software or image data. The image processing unit 410 reads image data stored in the RAM 402, for example, and performs various image processing such as enlargement or reduction and color adjustment of a JPEG, JBIG, and the like, for example.

The operation unit 102 provides a UI for the user to control the image forming apparatus 100 and handles input/output of information between the image forming apparatus 100 to the user. Also, the operation unit 102 is equipped with the CPU 411 of the operation unit 102, a display unit 412 that is equipped with an LCD, LED, or the like, and an input unit 413 that includes a touch panel, hardware key, or the like. Additionally, the operation unit 102 may also be equipped with an interface, such as an NFC reader/writer and a Bluetooth (registered trademark) module, for exchanging data with a mobile terminal of the user.

The person detection/facial authentication unit 420 performs detection of an authentication target person and facial authentication of the person, and is equipped with the CPU 421, the person detection sensor 111, the first camera 112, and the second camera 113. A ROM 422 stores a program and the like that is executed by the CPU 421. A RAM 423 is used as a work memory for the CPU 421. The scanner unit 430 generates image data by optically reading an image from an original. The printer unit 440 prints an image onto printing medium (paper) in accordance with an electrophotographic method, for example.

Figure 5:
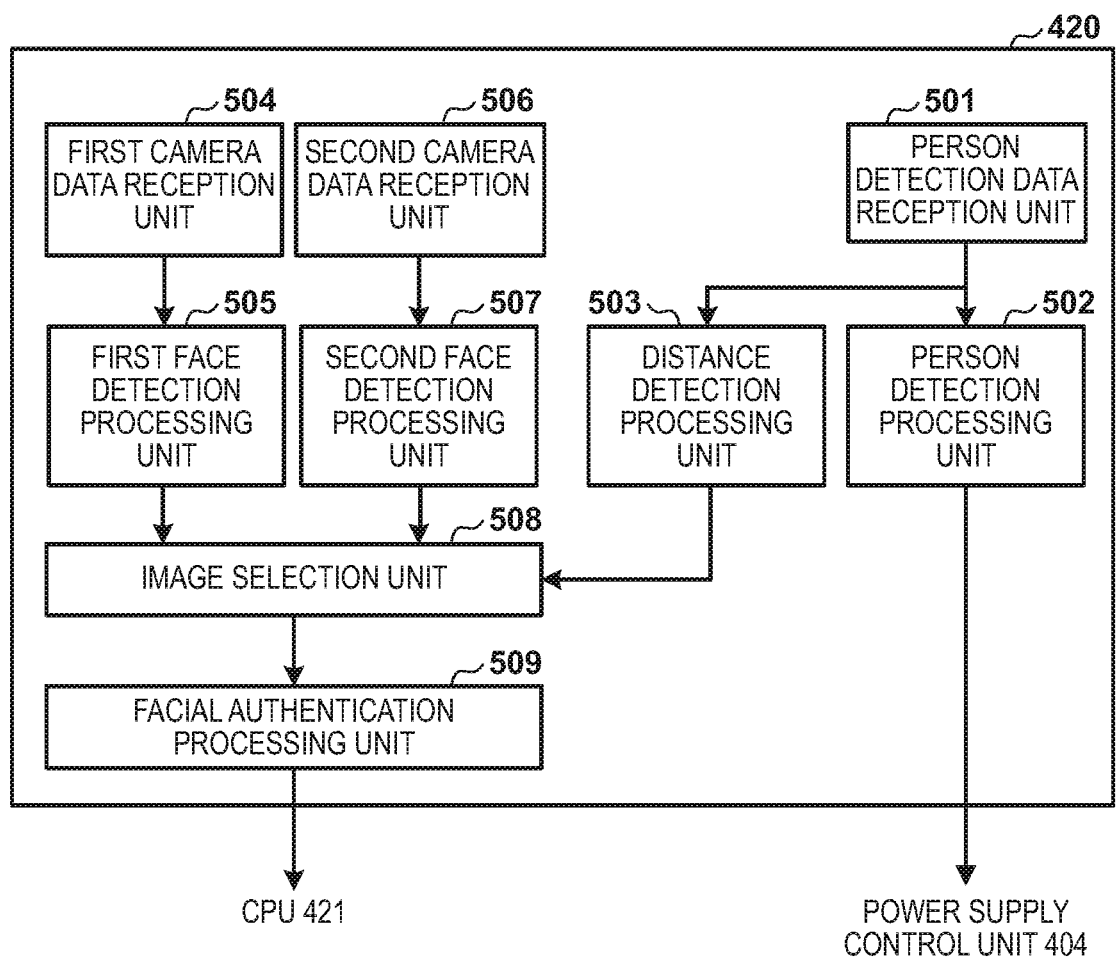
FIG. 5 is a functional block diagram for describing a software configuration of a person detection/facial authentication unit of the image forming apparatus.

FIG. 5 is a functional block diagram for describing a software configuration of the person detection/facial authentication unit 420 of the image forming apparatus 100 according to a first embodiment. Note, the function illustrated by the block diagram is achieved by the CPU 421 of the person detection/facial authentication unit 420 executing a program stored in the ROM 422.

A person detection data reception unit 501 receives data detected by the person detection sensor 111 and transmits it to a person detection processing unit 502 and a distance detection processing unit 503.

The person detection processing unit 502 determines whether or not there is a person within the detection range 200 based on the data received from the person detection data reception unit 501, and transmits the determination result to the power supply control unit 404. At that time, a method in which it is determined that a person is present if a value of an intensity signal of infrared light that the pyroelectric infrared sensor outputted is greater than or equal to a threshold, for example, may be used as the method for determining that a person is present. The power supply control unit 404, after receiving the result that the person detection processing unit 502 determined that a person is present, starts supplying power to the first camera 112 and the second camera 113 of the person detection/facial authentication unit 420.

The distance detection processing unit 503, based on data of the person detection data reception unit 501, detects a distance to the person and transmits distance information which is a detection result to an image selection unit 508. Description is given regarding a method of distance detection in which an infrared array sensor is used with reference to FIG. 6, as one example.

FIG. 6 shows views for describing a method of distance detection in which an infrared array sensor is used in the image forming apparatus 100 according to a first embodiment.

For the infrared array sensor in FIG. 6, infrared light receiving elements that receive infrared light are arranged in a matrix form. The infrared array sensor has the characteristic that it identifies, as a temperature distribution, the shape (detection region) of a heat source, by using a temperature value based on the amount of infrared light (light reception result) received by each infrared light receiving element. In FIG. 6, description is given for an example of an infrared array sensor in which a total of 64 infrared light receiving elements are arranged in 8 rows of 1 to 8 and 8 columns of a to h. In the following description, denotation of element 1a to element 8h is indicated when designated the position of each infrared light receiving element of the person detection sensor 111.

6a of FIG. 6 illustrates a state in which a person is approaching the image forming apparatus 100 from a position indicated by reference numeral 601 to a position indicated by reference numeral 602.

6b of FIG. 6, illustrates a detection result of the infrared array sensor when the person is present at the position indicated by reference numeral 601 and the distance to the person is D1. Here, the light receiving elements which reach the highest temperature are elements 3d to 5d, and the element whose row number is largest is 5d. Accordingly, the largest row number is 5.

6c of FIG. 6, illustrates a detection result of the infrared array sensor when the person is present at the position indicated by reference numeral 602 and the distance to the person is D2 (D1>D2). Here, the light receiving elements which reach the maximum high temperature are elements 4c to 7c, 3d to 8d, 3e to 8e, and 4f to 7f. Accordingly, the elements whose row numbers are largest are 8d and 8e, and the largest row number is 8.

In this way, there is dependency relationship between the row number of the light receiving element with the highest temperature and the distance to the image forming apparatus 100 from the person, and therefore it is possible to detect the distance from the person to the image forming apparatus 100 if the association relationship between the row number and the distance is clear.

Note, the method described in FIG. 6 is only one example, and it is possible to detect the distance by another publicly known method. For example, the distance to the person may be detected by using a sensor that can detect the distance to an object such as an ultrasonic sensor. Alternatively, the distance to the person may be detected based on the first camera image captured by the first camera 112 or be detected based on the size of a part of the person's body. The front part of the feet may be used, for example, as the part of the body at that time.

A first camera data reception unit 504 receives the first camera image that the first camera 112 captured and transmits it to a first face detection processing unit 505. The first face detection processing unit 505 determines whether or not the face of the person is present within the first camera image received from the first camera data reception unit 504, and transmits a first camera face image included in the first camera image to the image selection unit 508 in a case where it is determined that a face is present. For the algorithm for face detection here, a face detection algorithm that uses a Haar-like feature amount or the like is used, for example. Also, in the first embodiment, the first camera 112 uses a fish-eye lens, and because distortion is present in the image data of the first camera 112, image correction processing such as distortion correction or enlargement is necessary in order to detect the face of the person with high accuracy. These image correction processes are performed by the first face detection processing unit 505.

A second camera data reception unit 506 receives the second camera image that the second camera 113 captured and transmits it to a second face detection processing unit 507. The second face detection processing unit 507 determines whether or not the face of the person is present within the second camera image received from the second camera data reception unit 506, and transmits a second camera face image included in the second camera image to the image selection unit 508 in a case where it is determined that a face is present. For the algorithm for face detection here, similarly to the first face detection processing unit 505, a face detection algorithm that uses a Haar-like feature amount or the like is used, for example.

The image selection unit 508 selects either the first camera face image or the second camera face image based on the distance information that the distance detection processing unit 503 generated and transmits it to a facial authentication processing unit 509. In the first embodiment, when the distance to the person is longer than the face detection limit L, the first camera face image is selected, and when the distance to the person is shorter than the face detection limit L, the second camera face image is selected.

The facial authentication processing unit 509 calculates feature amount data from the face image data received from the image selection unit 508, compares this against dictionary feature amount data which is feature amount data registered in advance, and authenticates whether or not the person has received permission to use the image forming apparatus 100. The dictionary feature amount data may be stored to a storage unit (not shown) of the person detection/facial authentication unit 420 and may be stored to the HDD 408 of the controller 400 or to an external server or the like via the LAN. Then, the authentication result is transmitted to the CPU 401 of the controller 400. The CPU 401, after receiving the authentication result, in a case where the person has received permission to use the image forming apparatus 100, performs processing such as displaying to the display unit 412 a screen in accordance with the settings of the person. Meanwhile, in a case where the person has not received usage permission, processing such as displaying something to that effect to the display unit 412 is performed.

FIG. 7 is a flowchart for describing processing in which the person detection/facial authentication unit 420 of the image forming apparatus 100 according to a first embodiment performs a person detection/facial authentication. Note, the procedure illustrated by this flowchart is achieved by the CPU 421 executing a program stored in the ROM 422. Note, the processing of FIG. 7 is started when the power mode of the image forming apparatus 100 transitions to the sleep mode, an instruction for transitioning to the sleep mode is made from the CPU 401 of the controller 400 to the CPU 421, and transition to the sleep mode has completed. The image forming apparatus 100 performs person detection by the person detection sensor 111 in the sleep mode.

Firstly, the CPU 421 performs person detection processing in step S701. The person detection processing is performed by the person detection processing unit 502 as described above. Next, step S702 is advanced to, and the CPU 421 determines whether or not a person is detected; in a case where it is determined that a person is detected step S703 is advanced to and the CPU 421 activates the first camera 112 by turning on the power supply of the first camera 112, and performs the facial authentication processing by the first camera 112. Note, in a case where the power supply of the first camera 112 is already on at this time, only the facial authentication processing is performed. Meanwhile, the processing transitions to step S701 in a case where it is determined that a person is not detected in step S702. As described above, the facial authentication by the first camera 112 is performed by the first camera data reception unit 504, the first face detection processing unit 505, and the facial authentication processing unit 509. Hereinafter, there are cases where processing, in which the facial authentication processing unit 509 performs the facial authentication by using the captured image captured by the first camera 112, is denoted as "facial authentication by the first camera" for the sake of convenience. Also, similarly, there are cases where processing, in which the facial authentication processing unit 509 performs the facial authentication by using the captured image captured by the second camera 113, is denoted as "facial authentication by the second camera" for the sake of convenience.

Next, step S704 is advanced to, and the CPU 421 determines whether or not the facial authentication by the first camera 112 is complete, and step S705 is advanced to when it is determined that the facial authentication processing by the first camera 112 has completed. In step S705, the CPU 421 transmits an ID (identification information) of a user whose authentication is complete as an authentication result to the controller 400, and ends the processing.

Meanwhile, in a case where the CPU 421 determines that the facial authentication processing by the first camera 112 has not completed in step S704, step S706 is advanced to, and the CPU 421 detects the distance to the person and determines whether or not the distance is less than or equal to the face detection limit L. Here, distance detection is performed by the distance detection processing unit 503 as described above. Here, when it is determined that the distance to the person is less than or equal to the face detection limit L, step S707 is advanced to, and the CPU 421 activates the second camera 113 by turning on the power supply of the second camera 113 and performs the facial authentication processing by the second camera 113. Note, in consideration of the activation time of the second camera 113 at this time, the timing of activation of the second camera 113 may be made to be before the distance to the person becomes less than or equal to the face detection limit L. Note, at this time, in a case where the power supply of the second camera 113 is already on at the timing at which the distance to the person becomes less than or equal to the face detection limit L, only the facial authentication processing is performed. In this way, it is possible to quickly switch the camera that executes image capturing for authentication.

As described above, the facial authentication by the second camera 113 is performed by the second face detection processing unit 507 and the facial authentication processing unit 509. By this, it becomes possible to automatically switch to facial authentication by the second camera 113 when the person approaches to a distance at which image capture is not possible for the facial authentication for the first camera 112. Also, in a case where the distance is greater than or equal to the face detection limit L in step S706, step S708 is advanced to, and the CPU 421 determines whether or not a person is detected. Details of the processing are the same as in step S702. When it is determined that a person is detected in step S708, step S704 is advanced to, and the CPU 421 performs the facial authentication by the first camera 112 again. Meanwhile, when it is determined that a person has not been detected in step S708, the processing transitions to step S701 in order to perform person detection again. By this, it is possible to reduce performing unnecessary authentication processing such as in a case where the person moves during the facial authentication processing or distance measurement processing and leaves the person detection range 201.

Next, after the processing of step S707, step S709 is advanced to, and the CPU 421 determines whether or not the facial authentication by the second camera 113 has completed. When it is determined that the facial authentication processing by the second camera 113 has completed here, step S705 is advanced to, and the CPU 421 transmits to the controller 400 an ID of a user for whom authentication completed as an authentication result, and ends the processing. Meanwhile, when, in step S709, the CPU 421 determines that the facial authentication processing by the second camera 113 has not completed, step S710 is advanced to, and the CPU 421 detects the distance to the person and determines whether or not the distance is less than or equal to the face detection limit L. Here, when it is determined that the distance is less than or equal to the face detection limit L, step S709 is advanced to, and the facial authentication by the second camera 113 is performed again. Meanwhile, in a case where the distance is greater than or equal to the face detection limit L, the processing transitions to step S704 in order to perform the facial authentication by the first camera 112 again. By this, when the person moves to a distance further away from the face detection limit L during the facial authentication processing or distance measurement processing, it is possible to continue the facial authentication processing by the first camera 112 which is capable of facial authentication at that distance.

According to the first embodiment as described above, it is possible to perform the facial authentication of a person by the first camera 112 in a case where the distance between the person and the image forming apparatus 100 is longer than the face detection limit L, and by the second camera 113 in a case where the distance is shorter than the face detection limit L. By this, it is possible to detect a person approaching the image forming apparatus 100 as well as perform the facial authentication of the person.

Second Embodiment

Description was given in the above described first embodiment of an example in which the first camera 112 is activated when person detection by the person detection sensor 111 has completed and the facial authentication processing is started. In contrast to this, description is given in the second embodiment of an example in which a distance to a person is detected, and the first camera 112 is activated and the facial authentication processing is started when the distance becomes shorter than a predetermined distance. Note, because the hardware configuration of the image forming apparatus 100 according to the second embodiment is approximately the same as in FIG. 4 of the foregoing first embodiment, description thereof is omitted. However, in the second embodiment, the image selection unit 508 selects a first camera face image if the distance to a person is longer than the face detection limit L and closer than the approach detection range 203, and selects the second camera face image if the distance is shorter than the face detection limit L.

FIG. 8 is a flowchart for describing processing in which the person detection/facial authentication unit of the image forming apparatus 100 according to the second embodiment performs a person detection/facial authentication. Note, the procedure illustrated by this flowchart is achieved by the CPU 421 executing a program stored in the ROM 422. Note, in FIG. 8, the processing common to the above described FIG. 7 is assigned the same reference numerals, and description thereof is omitted.

When the CPU 421 in step S702 determines that a person is detected, it advances to step S801, detects the distance to the person, and determines whether or not the distance is less than or equal to the approach detection range 203. Here, when it is determined that the distance is less than or equal to the approach detection range 203, step S703 is advanced to, and the CPU 421 activates the first camera 112 by turning on the power supply of the first camera 112 and performs the facial authentication processing by the first camera 112. Meanwhile, in a case where the distance is greater than or equal to the approach detection range 203 in step S801, the CPU 421 transitions the processing to step S801 and detects the distance again. By this, it becomes possible to perform the facial authentication only on a person who entered the approach detection range 203 which is narrower than the person detection range 201, and a risk of erroneous authentication for a person who does not intend to use the image forming apparatus 100 can be reduced.

Next, when the CPU 421 in step S704 determines that facial authentication processing has completed, it advances to step S802, and the CPU 421 detects the distance to the person, and determines whether or not the distance is less than or equal to the face detection limit L. Here, when it is determined that the distance is less than or equal to the face detection limit L3, step S803 is advanced to, and the CPU 421 activates the second camera 113 by turning on its power supply. Meanwhile, in a case where the distance is greater than or equal to the face detection limit L in step S802, the CPU 421 transitions the processing to step S802 and detects the distance to the person again.

By this, the second camera 113 can be activated prior to the person entering the person operation range 202, and preparation for executing functions other than facial authentication such as line of sight detection or person tracking using the second camera 113 becomes possible.

By virtue of the second embodiment described above, facial authentication for a person is performed by the first camera 112 if the distance between the person and the image forming apparatus 100 is larger than the face detection limit L and shorter than the approach detection range 203 and by the second camera 113 if that distance is shorter than the face detection limit L.

By this, a risk of erroneous authentication for a person who does not intend to use the image forming apparatus 100 can be reduced and facial authentication of a person becomes possible even in a case where the distance to the image forming apparatus 100 is close.

Also, description is given regarding a timing at which the image forming apparatus 100 stops the person detection/facial authentication processing.

One example is to stop the person detection/facial authentication processing while the user is authenticated/logged in. By controlling in this way, it is possible to prevent entering a state in which a plurality of users are simultaneously logged in. Of course, control in which person detection/facial authentication processing is executed even while a user is authenticated/logged in, and in which a person that is authenticated during that time is treated as someone for whom usage is scheduled, and whose personal particular settings are called in advance may be considered. At this time, the facial authentication processing is performed by using only the first camera 112. By controlling in this way, it becomes possible to reflect unique settings quickly when a user for whom usage is scheduled actually uses the apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151035, filed Aug. 3, 2017, which is hereby incorporated by reference herein in its entirety.

What is claimed is:

1. An information processing apparatus, comprising:
a detection unit configured to detect a moving body around the information processing apparatus and a distance to the moving body;
a first image capturing unit capable of capturing a moving body in a first image capturing range; and
a second image capturing unit capable of capturing a moving body in a second image capturing range, wherein the second image capturing range is narrower than the first image capturing range;
one or more memory devices that store a set of instructions; and
one or more processors that execute the set of instructions to:
perform facial authentication based on image data captured by the first image capturing unit; and
on condition that the facial authentication based on image data captured by the first image capturing unit is not completed and the distance detected by the detection unit becomes shorter than a predetermined distance, control to supply power to the second image capturing unit so it is capable of capturing the moving body and perform facial authentication based on image data captured by the second image capturing unit,
wherein in a case where the facial authentication based on image data captured by the first image capturing unit is completed, control not to supply power to the second image capturing unit.

2. The information processing apparatus according to claim 1, wherein the second image capturing unit is arranged on an upper portion of a front side of the information processing apparatus.

3. The information processing apparatus according to claim 1, wherein the detection unit includes an infrared array sensor.

4. The information processing apparatus according to claim 3, wherein the detection unit, based on a position of an element that detected a highest temperature among light receiving elements of the infrared array sensor, detects the distance to the moving body.

5. The information processing apparatus according to claim 1, wherein the one or more processors execute the set of instructions to:
use a face detection algorithm that uses a Haar-like feature amount.

6. The information processing apparatus according to claim 1, wherein the one or more processors execute the set of instructions to:
execute different image correction processing on image data captured by the first image capturing unit and image data captured by the second image capturing unit,
wherein the one or more processors execute the set of instructions to:
perform facial authentication based on image data on which the image correction processing is executed.

7. The information processing apparatus according to claim 1, wherein the one or more processors further execute the set of instructions to:
based on image data of a front part of a foot of an authentication target person as the moving body included in the image data captured by the first image capturing unit, determine whether or not the authentication target person is facing the information processing apparatus.

8. The information processing apparatus according to claim 1, wherein the one or more processors further execute the set of instructions to:
in a case where the detection unit detects the moving body in a power saving state, at least start a power supply to the first image capturing unit.

9. The information processing apparatus according to claim 8, wherein the one or more processors execute the set of instructions to:
start the power supply to the first image capturing unit before the distance detected by the detection unit becomes a first distance that is longer than the predetermined distance.

10. The information processing apparatus according to claim 1, wherein the predetermined distance is a distance at which authentication based on image data captured by the first image capturing unit cannot be performed.

11. The information processing apparatus according to claim 1, wherein the one or more processors execute the set of instructions to:
in a case where the distance detected by the detection unit is a second distance that is longer than the predetermined distance, control to perform authentication based on image data captured by the first image capturing unit.

12. A method of controlling an information processing apparatus comprising a detection unit configured to detect a moving body around the information processing apparatus and a distance to the moving body; a first image capturing unit capable of capturing a moving body in a first image capturing range; and a second image capturing unit capable of capturing a moving body in a second image capturing range, wherein the second image capturing range is narrower than the first image capturing range, the method comprising:
performing facial authentication based on image data captured by the first image capturing unit; and
on condition that the facial authentication based on image data captured by the first image capturing unit is not completed and the distance detected by the detection unit becomes shorter than a predetermined distance, controlling to supply power to the second image capturing unit so it is capable of capturing the moving body and performing facial authentication based on image data captured by the second image capturing unit,
wherein in a case where the facial authentication based on image data captured by the first image capturing unit is completed, controlling not to supply power to the second image capturing unit.

13. A non-transitory computer-readable storage medium storing instructions of a program for causing a computer in an information processing apparatus comprising a detection unit configured to detect a moving body around the information processing apparatus and a distance to the moving body; a first image capturing unit capable of capturing a moving body in a first image capturing range; and a second image capturing unit capable of capturing a moving body in a second image capturing range, wherein the second image capturing range is narrower than the first image capturing range, to operate so as to:

perform facial authentication based on image data captured by the first image capturing unit; and on a condition that the facial authentication based on image data captured by the first image capturing unit is not completed and the distance detected by the detection unit becomes shorter than a predetermined distance, controlling to supply power to the second image capturing unit so it is capable of capturing the moving body and performing facial authentication based on image data captured by the second image capturing unit, wherein in a case where the facial authentication based on image data captured by the first image capturing unit is completed, controlling not to supply power to the second image capturing unit.

14. The information processing apparatus according to claim 1, wherein in a case where the facial authentication based on image data captured by the first image capturing unit is completed, control not to supply power to the second image capturing unit, even though the distance detected by the detection unit becomes shorter than the predetermined distance.

* * * * *